F. A. FROMMANN.
VEHICLE WHEEL.
APPLICATION FILED JUNE 21, 1917.
1,348,165.
Patented Aug. 3, 1920.
2 SHEETS—SHEET 1.
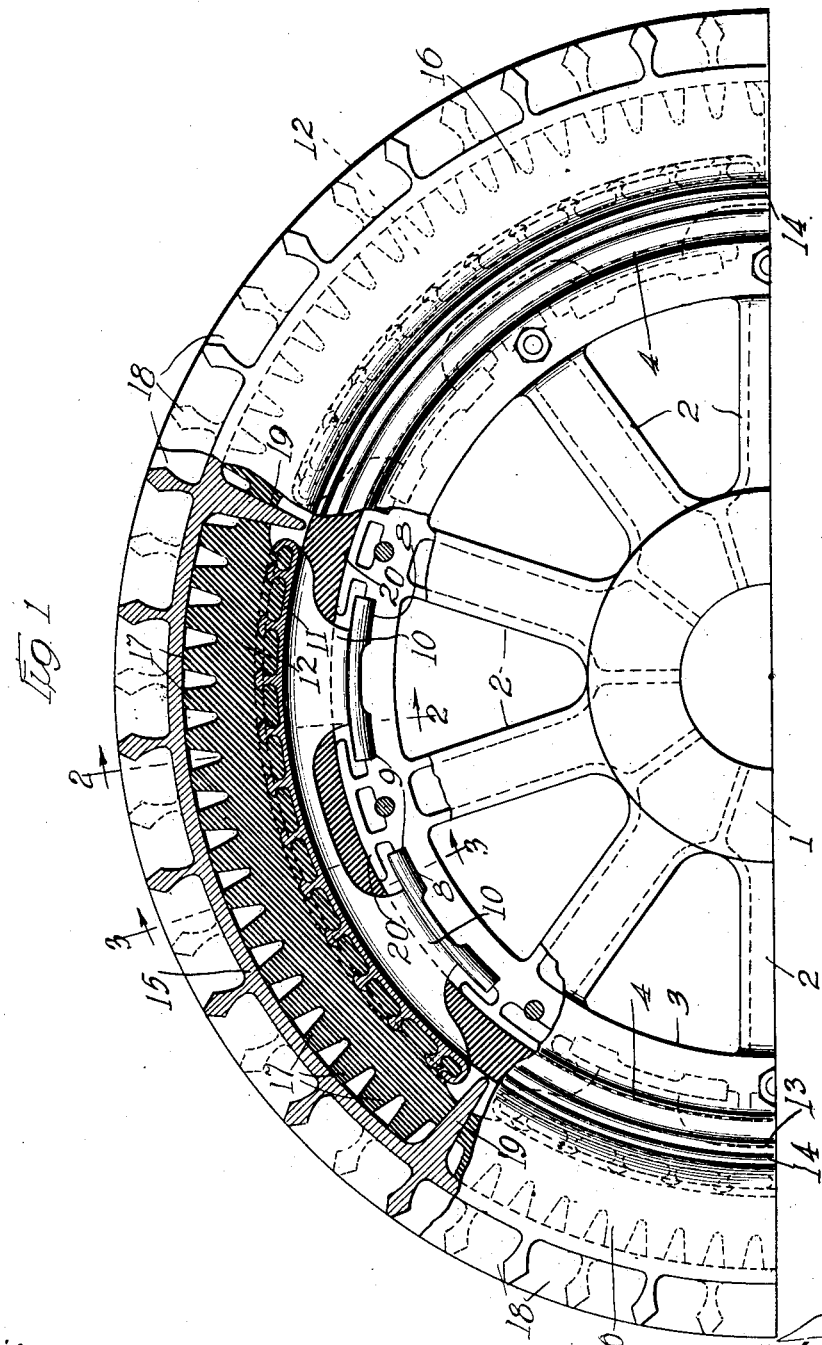
Witnesses
Harry R. L. White
W. P. Kilroy
Inventor
Franklin A. Frommann
By Rudolph Wm. Lotz, Atty.

F. A. FROMMANN.
VEHICLE WHEEL.
APPLICATION FILED JUNE 21, 1917.
1,348,165.
Patented Aug. 3, 1920.
2 SHEETS—SHEET 2.
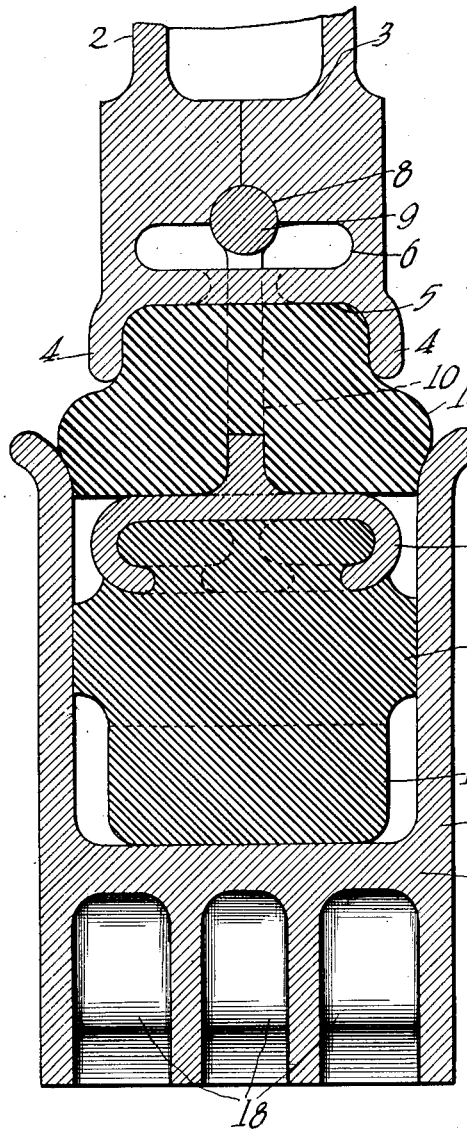
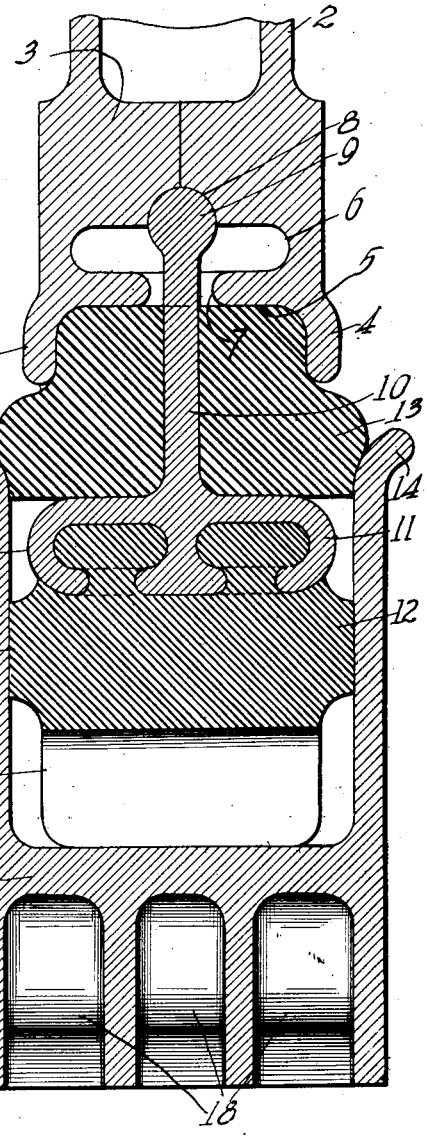

UNITED STATES PATENT OFFICE.

FRANKLIN A. FROMMANN, OF CHICAGO, ILLINOIS.

VEHICLE-WHEEL.

1,348,165. Specification of Letters Patent. Patented Aug. 3, 1920.

Application filed June 21, 1917. Serial No. 176,195.

*To all whom it may concern:*

Be it known that I, FRANKLIN A. FROMMANN, citizen of the United States, residing at Chicago, in the county of Cook and State of Illinois, have invented certain new and useful Improvements in Vehicle-Wheels; and I do hereby declare the following to be a full, clear, and exact description of the invention, such as will enable others skilled in the art to which it appertains to make and use the same.

This invention relates to improvements in vehicle wheels, and has for its particular object to provide a wheel particularly adapted for motor-propelled vehicles in which the cushions are housed inwardly of the rim or tire of the wheel, and more particularly in which the tire member is capable of limited cushioned lateral motion relative to the wheel body.

The invention consists in the features of construction and combinations of parts hereinafter fully described and particularly claimed.

In the accompanying drawings illustrating a suitable embodiment of the invention:

Figure —1— is a fragmentary view partly in side elevation and partly in section of a wheel constructed in accordance with the invention.

Fig. —2— is a fragmentary detail radial section on an enlarged scale of the same on the line 2—2 of Fig. —1—.

Fig. —3— is a similar section on the line 3—3 of Fig. —1—.

Owing to the extreme wear to which the rubber tires of vehicles, and particularly heavy, freight-carrying motor-propelled vehicles, are subjected in travel, it has been found advantageous to dispose cushions giving the resilient action of tires of the wheels of such vehicles inwardly of the tractive surface of the said wheels, so as to protect them from wear, while securing the benefit of their elasticity. Such wheels have, however, been heretofore constructed so as to be absolutely rigid and incapable of absorbing lateral strains and shock imparted to the wheels in travel, and this rigidity has necessitated building such wheels extraordinarily strong and heavy in order to resist such lateral strains and shocks which the rubber tires of such wheels generally absorb, as for example, in running in and out of car tracks, or striking the edges of stones in the road, and running in and out of ruts.

The object of the present invention is, therefore, to provide a vehicle wheel in which the cushions are disposed inwardly of the rim or tire, and in which the said rim or tire is capable of sufficient lateral movement relatively to the wheel-body to absorb such lateral strains and shocks without injury to the wheel body, and without in any way interfering with the resiliency of the cushions for absorbing the radial shocks and strains due to passing over road obstructions.

The wheel embodying my invention, as shown in the accompanying drawings, comprises the body portion which includes the hub 1, spokes 2 and annular felly member 3, said parts being either cast integral with each other, or suitably rigidly connected with each other in any suitable manner. The said felly member is provided with annular parallel slightly flaring edge flanges 4 bordering channeled pockets 5. In the bottom of each of the latter is a pocket 6 having a contracted mouth portion 7 which constitutes an opening or slot connecting the pockets 5 and 6. In the bottom of each pocket 6 there is provided a recess 8. The latter receives the inner end portion 9 of the shank 10 of shoes 11 in which rubber or similar cushions 12 are mounted, each of the latter being segmental and extending through an arc of any desired length consistent with the desired action of the wheel in travel. The shanks 10 consist preferably of flat webs provided with a plurality of relatively large openings through which the rubber of the cushions 13 mounted on said shanks is adapted to flow during vulcanization so as to firmly secure said cushions to said shanks. Said cushions rest upon the inner surfaces of the shoes 11 and are confined between the same and the bottoms of the channels 5 and completely fill the space between the flanges 4. The cushions 13 are preferably of considerably greater width at their outer end than at their base portions, such outer portions being confined between the flaring end portions of the flanges 14 of the rim and tire member 15. The said member consists of a continuous rim comprising an annular web provided with inwardly extending annular flanges 16 terminating in said flaring portions 14 and bordering a deep annular channel adapted to receive the cushions 12 and shoes 11. The said shoes 11 are of less maximum width than the inner width of said channel so as to leave free spaces at each side thereof to permit their lateral movement with respect to the channels. The cushions 12 are normally of greater width between their ends than the said channel, and are crowded into the latter and terminate in the serrated end portions 17, the solid portions of which are adapted to be displaced under the influence of load on the wheel as the body portions of the cushions move radially in the channels, under the influence of load in an obvious manner. The outer circumferential face of the rim and tire member 15 presents a series of pockets 18 adapted to receive blocks of wood or the like, constituting the tread surface of the structure.

Spanning the channel of the rim and tire member bordered by the said flanges 16 at intervals, are partition members 19 between which the cushions 12 are confined and held against rotation relatively to the said rim. The shoes 11 are of a length less than that separating contiguous partition members 19, and the cushions 12 are normally of greater length than said distance so that while said cushions are firmly held against rotation relatively to the rim and tire member, the shoes are capable of a very limited movement relatively thereto circumferentially thereof, against the resistance offered by contact of the ends of the cushions 12 with the said partition members 19.

The pockets 5 terminate in what might be termed partition projections 20 preferably formed in radial alinement with the ends of the spokes, and the slots or openings 7 in the bottoms of the said channeled pockets 5 are of a length substantially equal to that of the substantially cylindrical formations 9 at the inner ends of the shanks 10 of said shoes 11. The latter are adapted to oscillate on the axes of said formations 9 as fulcrums to permit a slight lateral movement of the rim or channel member 15 relatively to the felly 3 of the rim or body of the wheel, such lateral movement being resisted by the cushions 13 and limited by engagement of the shanks 10 of the shoes 11 with the side walls of the openings 7. Such lateral movement is distributed practically about the entire circumference of the wheel, that is to say, that the portion of the rim or tire disposed above the horizontal plane of the axis of rotation would move laterally relatively to the wheel body in a direction opposite to that of the portion of the rim or felly disposed below said plane. It will be noted that the cushions 13 function to a small extent as a cushioning means for absorbing radial shocks and strains imposed upon the wheel, and tending to effect relative radial movement between the wheel body and the rim and tire member. The said cushions 13 remain rigid with respect to the wheel body, and will not move radially with respect to the rim or tire member in accordance with the degree of compression of the cushions 12, but will serve to resist such radial movement to the extent of the resistance offered by the frictional engagement of the side edge portions of the cushions 13, and the crowding of the same with respect to the flaring edge portions 14 of the flanges 16 of the rim or tire member.

The shoes 11 and cushions 12 describe preferably relatively short arcs which will promote freedom of relative movement and a better distribution of the cushioning effect over the entire circumference of the wheel in travel.

While I have shown the preferred embodiment of the invention in the accompanying drawings, it will be understood, of course, that such embodiment is capable of considerable variation and modification without departing from the invention as defined in the appended claims.

I claim as my invention:

1. A vehicle wheel including a body member, a rim member, elastic cushioning means interposed therebetween adapted to permit a relative lateral movement of said members, and means associated with said cushion and one of said members for preventing relative radial movement of said member and said cushion.

2. A vehicle wheel including a body member, a rim member, elastic cushioning means interposed therebetween adapted to permit a relative lateral movement of said members, means associated with said cushion and one of said members for preventing relative radial movement of said member and said cushion, and cushions interposed between said members adapted to permit relative radial movement thereof.

3. A vehicle wheel comprising a body member, a rim member of greater inner diameter than the outer diameter of the body member, cushioning means engaged with both members permitting relative lateral movement thereof, and means engaged with said cushioning means and said body member for limiting the relative lateral movements thereof, and preventing relative radial movement of the same.

4. A vehicle wheel comprising a body member, a rim member of greater inner diameter than the outer diameter of the body member, cushioning means engaged with both members permitting relative lateral movement thereof, cushioning means interposed between said members for permitting relative radial movement thereof, and means engaged with one of said members and with both said cushioning means for preventing relative radial movement between the last-named member and said first-named cushioning means.

5. A vehicle wheel comprising a body member, a rim member, cushioning means interposed between said members permitting relative lateral movement thereof, cushioning means permitting relative radial movement thereof, and shoes engaged with one of said members and with both said cushioning means for preventing the first-named cushioning means from yielding radially to relative radial movement of said members and causing said last-named cushioning means to yield to relative radial movement of said members.

6. A vehicle wheel comprising a body member, a rim member, cushioning means interposed between said members permitting relative lateral movement thereof, cushioning means permitting relative radial movement thereof, and shoes engaged with one of said members and with both said cushioning means for preventing the first-named cushioning means from yielding radially to relative radial movement of said members and causing said last-named cushioning means to yield to relative radial movement of said members, said shoes being pivotally movable with respect to one of said members.

7. A vehicle wheel comprising a body member, a rim member, cushioning means interposed between said members permitting relative lateral movement thereof, cushioning means permitting relative radial movement thereof, and shoes engaged with one of said members and with both said cushioning means for preventing the first-named cushioning means from yielding radially to relative radial movement of said members and causing said last-named cushioning means to yield to relative radial movement of said members, said shoes being pivotally movable with respect to one of said members, and stops for limiting the pivotal movement thereof.

8. A vehicle wheel comprising a body member, a rim member, cushioning means interposed between said members permitting relative lateral movement thereof, cushioning means permitting relative radial movement thereof, and shoes engaged with one of said members and with both said cushioning means for preventing the first-named cushioning means from yielding radially to relative radial movement of said members and causing said last-named cushioning means to yield to relative radial movement of said members, said shoes being pivotally movable with respect to one of said members on axes transverse to the axis of rotation of the wheel.

9. A vehicle wheel comprising a body member, a rim member, cushioning means interposed between said members permitting relative lateral movement thereof, cushioning means permitting relative radial movement thereof, and shoes engaged with one of said members and with both said cushioning means for preventing the first-named cushioning means from yielding radially to relative radial movement of said members and causing said last-named cushioning means to yield to relative radial movement of said members, said shoes being pivotally movable with respect to one of said members on axes transverse to the axis of rotation of the wheel, and stops for limiting the pivotal movement thereof.

10. A vehicle wheel comprising a body member, a rim member, cushioning means interposed between said members permitting relative lateral movement thereof, cushioning means permitting relative radial movement thereof, and shoes engaged with and pivotally movable relatively to the body member on axes and extending through the first-named cushioning means and engaging the last-named for preventing the first-named cushioning means from yielding radially to relative radial movement of said members and causing said last-named cushioning means to yield to relative radial movement of said members.

In testimony whereof I have signed my name in presence of two subscribing witnesses.

FRANKLIN A. FROMMANN.

Witnesses:
M. M. BOYLE,
C. L. BALDWIN.